US006065680A

United States Patent [19]

Choi

[11] Patent Number: 6,065,680

[45] **Date of Patent: *May 23, 2000**

[54] CARD AND DISK RECEPTOR CARRIER WITH A PIVOTABLE DOOR FOR USE IN AN INTERNET SET-TOP BOX

[75] Inventor: Yong-Hwan Choi, Seoul, Rep. of Korea

[73] Assignee: Daewood Electronics Co., Ltd., Rep. of Korea

[ * ] Notice: This patent is subject to a terminal disclaimer.

[21] Appl. No.: 09/047,460

[22] Filed: Mar. 25, 1998

[30] Foreign Application Priority Data

Mar. 13, 1997 [KR] Rep. of Korea .................... 97-11892

[51] Int. Cl.[7] .............................. H04B 1/38; G06K 7/06

[52] U.S. Cl. .......................... 235/475; 235/479; 235/482; 235/483; 235/485; 235/486

[58] Field of Search .................................. 235/475, 479, 235/480, 482, 483, 485, 486

[56] References Cited

U.S. PATENT DOCUMENTS

| | | | |
|---|---|---|---|
| 3,940,796 | 2/1976 | Huan et al. | 360/109 |
| 4,975,805 | 12/1990 | Schmutzler | 361/399 |
| 5,065,004 | 11/1991 | Mizuno et al. | 235/479 |
| 5,150,352 | 9/1992 | Kurihara | 369/258 |
| 5,331,144 | 7/1994 | Shima et al. | 235/486 |
| 5,360,969 | 11/1994 | Suzuki | 235/479 |
| 5,386,407 | 1/1995 | Park | 369/77.2 |
| 5,586,003 | 12/1996 | Schmitt et al. | 361/683 |
| 5,648,651 | 7/1997 | Inoue | 235/475 |
| 5,752,757 | 5/1998 | Choi | 312/319.1 |
| 5,821,515 | 10/1998 | Kitahara | 235/441 |
| 5,826,176 | 10/1998 | Choi | 455/90 |

FOREIGN PATENT DOCUMENTS

| | | |
|---|---|---|
| 0350509 | 1/1990 | European Pat. Off. . |
| 2306732 | 5/1997 | United Kingdom . |

*Primary Examiner*—Donald Hajec
*Assistant Examiner*—Douglas X. Rodriguez
*Attorney, Agent, or Firm*—Pennie & Edmonds LLP

[57] ABSTRACT

A card receptor for use in an internet set-top box is provided with a pivotable door, a card carrier with card/disk insertion slots to receive and to keep a card/disk therein through the card/disk insertion slots and a driving mechanism. The card carrier moves toward an inside position wherein the card/disk insertion slots stay within a housing of the internet set-top box, with the pivotable door being closed by the driving mechanism, and toward an outside position wherein the card/disk insertion slots stay outside a front panel through an opening of the housing, with the pivotable door being opened by the loading mechanism.

10 Claims, 3 Drawing Sheets

10
11
12
13
14
15
16
20
21
22
23
24
25
26
30
31
32
33
40
41
42
43
44
45
50
51
52
53
100
110
111
112
113
114
115
120
121
122
130
131
132
133
134
140
141
142
143
150

CARD AND DISK RECEPTOR CARRIER WITH A PIVOTABLE DOOR FOR USE IN AN INTERNET SET-TOP BOX

FIELD OF THE INVENTION

The present invention is directed to a sliding card receptor for use in an internet set-top box; and, more particularly, to a card receptor having a card carrier slidable between a protruding position for an inserting and an extracting operations of a card/disk, and a withdrawn position for protecting the card/disk in use.

DESCRIPTION OF THE PRIOR ART

Like in a satellite broadcasting tuner, in an internet set-top box for an exclusive use in web-browsing which leads users to reach world-wide information and to enjoy other service, e.g., home shopping, etc., the user pays an internet service provider for the internet service via a smart card. Such internet environment in the internet set-top box is normally serviced through a certain confirmation process wherein the information contained on the smart card is analyzed by a separate card reader, e.g., if the card is acceptable not in receiving such internet service after the smart card is inserted and kept in place in the internet set-top box. For this reason, a card insertion slot for receiving the smart card is prepared on a front panel of the internet set-top box. Further, a floppy disk insertion slot is needed to allow the user to keep downloaded data on a floppy disk.

The conventional card/floppy disk insertion slot is normally designed to be always exposed outside the internet set-top box, being flushed with a front panel.

While the card insertion slot employed in the prior art internet set-top box is capable of performing its assigned task, needs have continued to exist for an improved card receptor, since the card can easily be contaminated with dusts, motes and other particles in the conventional card slot. Further, the conventional card slot easily permits a baby or child to put something therethrough. In addition, since the conventional card slot is flushed with the front panel, the user is subjected to an inconvenience in inserting/extracting the smart card or the floppy disk into/from the internet set-top box.

SUMMARY OF THE INVENTION

It is, therefore, a primary object of the invention to provide a card receptor with a card carrier designed to be movable in a predetermined range.

Another object of the invention is to provide a card receptor having a pivotable door for enclosing a card carrier and a smart card from surroundings to thereby eschew the possibility of contamination.

Further object of the invention is to provide a card receptor, wherein a pivotable door is designed to move along with a card carrier via an automatic driving mechanism.

The above and other objects of the invention are accomplished by providing a card receptor for use in an internet set-top box comprising: a card receptor comprising: a housing having a bottom surface and a front panel with an opening formed through the front panel; a pivotable door for opening and closing the opening; a card carrier including a card insertion slot to receive and to keep a card therein through said card insertion slot, the card carrier movable between an inside position wherein the card insertion slot stays outside the front panel, and an outside position wherein the card insertion slot stays within the housing through the opening; a guiding means for guiding the movement of the card carrier between the inside and the outside positions, allowing the card carrier to be aligned with the opening; a carrier driving means for moving the card carrier toward the outside position thereof to allow the card insertion slot to protrude out of the front panel through the opening, and for moving the card carrier toward the inside position thereof to allow the card insertion slot to be enclosed from a surroundings; and an opening means for opening the pivotable door when the card carrier moves toward the outside position, for closing the pivotable door when the card carrier moves toward the inside position.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 2:
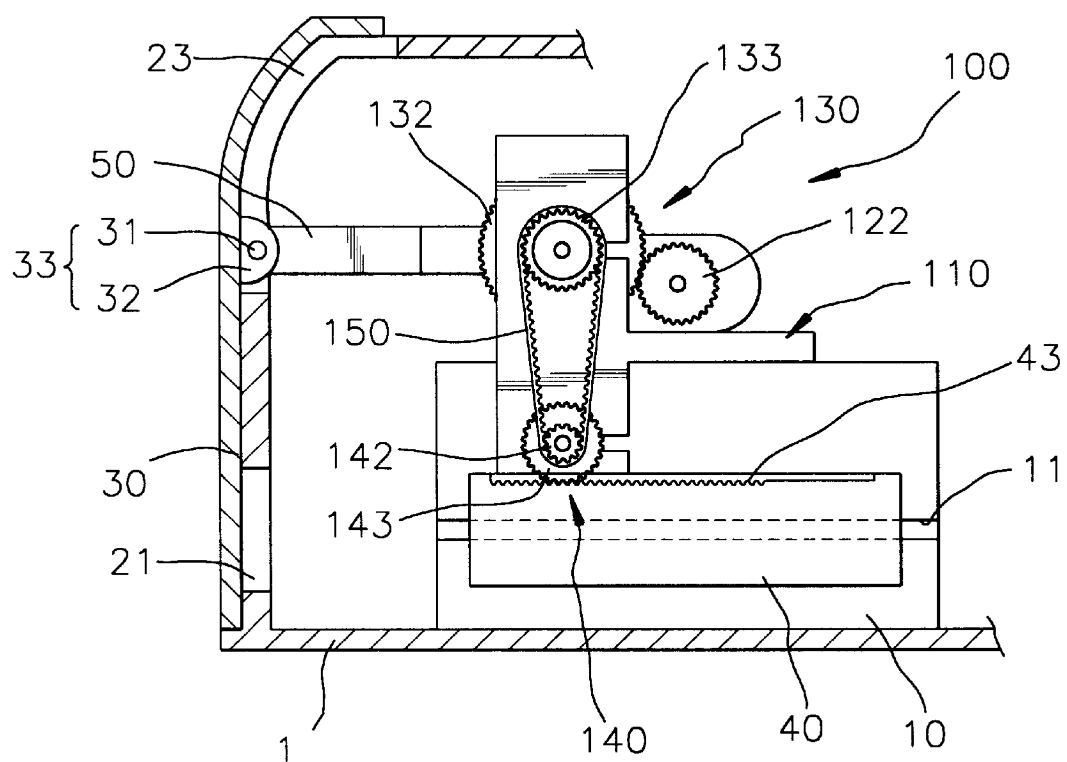
FIGS. 2 and 3 depict schematic lateral sectional views of the inventive card receptor, respectively.
Figure 3:
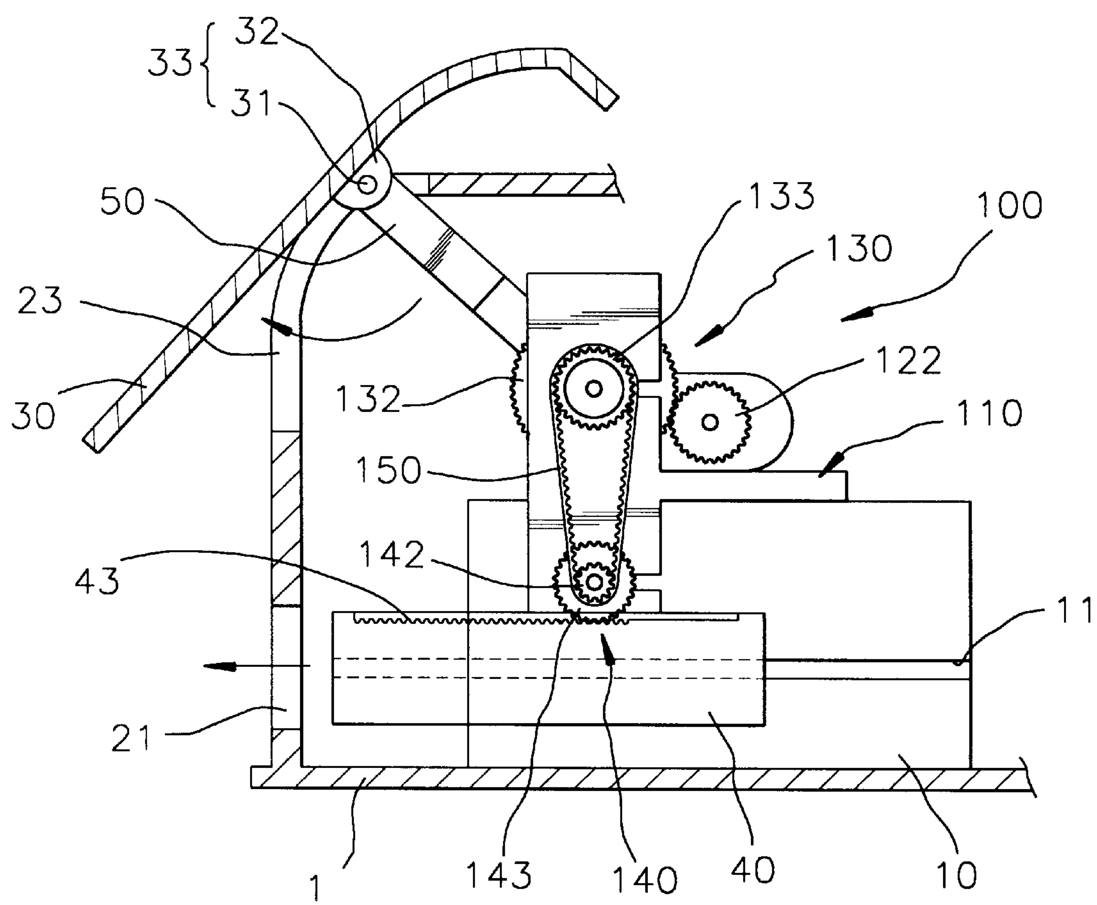

A preferred embodiment of the inventive card receptor for use with an internet set-top box will be now described with reference to FIGS. 1, 2 and 3.

Figure 1:
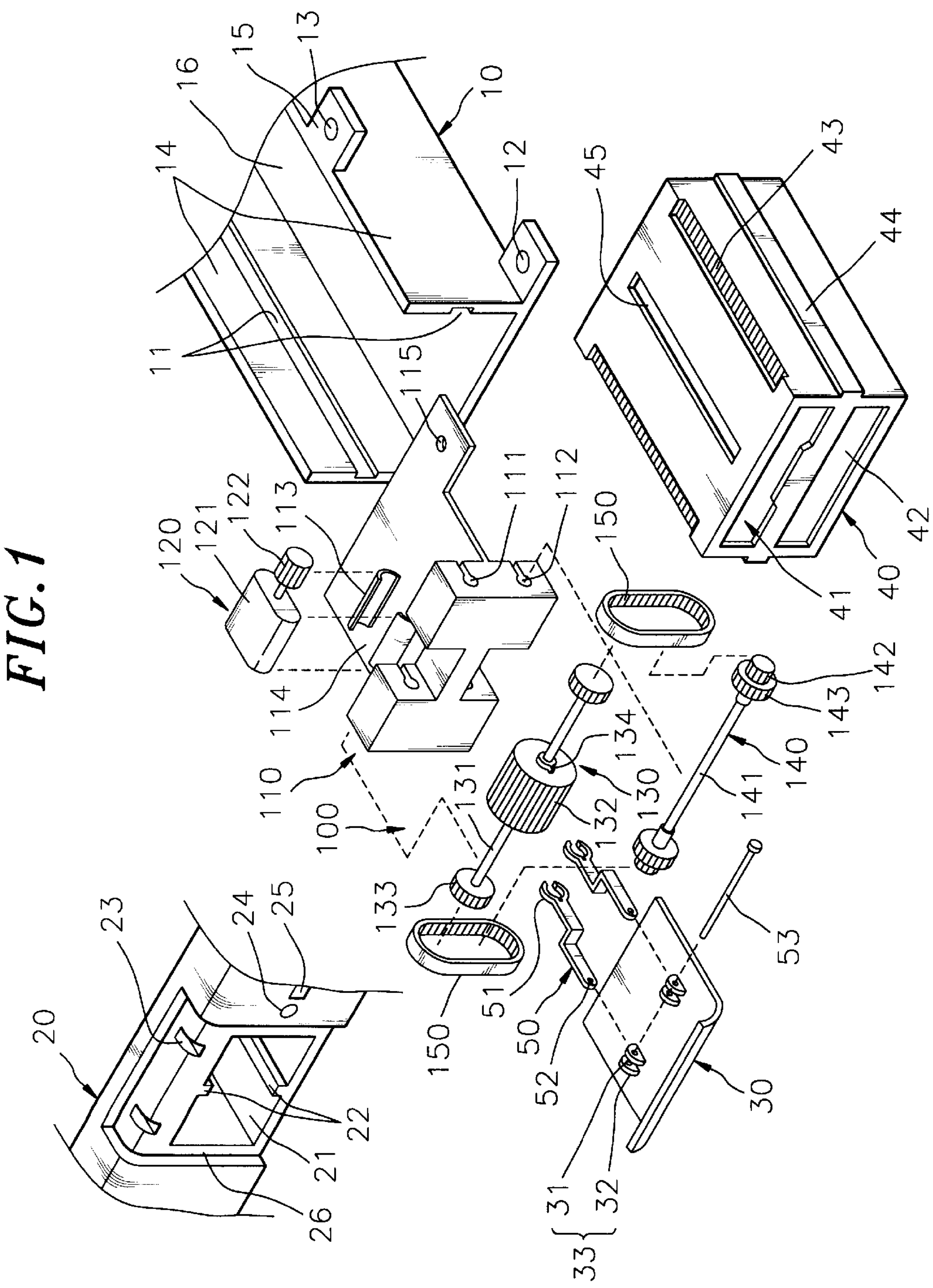
FIG. 1 shows an exploded perspective view of a prior art satellite broadcasting tuner provided with a movable card insertion carrier.

FIG. 1 is an exploded view of the inventive card receptor. The inventive card receptor is provided with a loading housing 10 fixed to a bottom surface of a housing of the internet set-top box, a card carrier 40 mounted within the loading housing 10 and having a card insertion slot 41 and a disk insertion slot 42, a door member 30 pivotably mounted above a front panel 20, and a driving mechanism 100 for moving the card carrier 40 back and forth, opening and closing the door member 30 at the same time by using a driving motor 120.

The loading housing 10 having a bottom plate 16 is fixed to the bottom surface of the housing of the internet set-top box by using a plurality of screws, being aligned with a box opening 21 of the front panel 20. For this, the loading housing 10 has a plurality of screw holes 12 through which the screws are driven into to fix the loading housing 10 on the bottom surface. The loading housing 10 further has a pair of side walls 14. Formed on each of the side walls 14 is a guiding groove 11 for guiding movements of the card carrier 40. A lug plate 15 having a screw hole 13 is formed on one of the side walls 14.

The card carrier 40 is mounted within the loading housing 10 to be guided by the loading housing 10. The card carrier 40 is movable to protrude outside the front panel 20 through the box opening 21 by a predetermined length. A pair of lateral protuberances 44 are formed on the card carrier 40 which are to be engaged into the guiding grooves 11, respectively, to guide the card carrier 40 when the card carrier 40 moves back and forth. The movement of the card carrier 40 is further guided by a pair of guiding slots 45 (only one is shown) formed on an upper and a lower surfaces of the card carrier 40, respectively, and a pair of corresponding guiding rails 22 formed on the front panel 20 and the bottom of the housing, respectively. A smart card and a floppy disk are inserted into the card carrier 40 through the card insertion slot 41 and the disk insertion slot 42, respectively. On an upper side of the card carrier 40, a pair of racks 43 are formed to receive a driving force from the driving mechanism 100.

The door member 30 has a generally thin plate shape coinciding with a descent portion 26 of the front panel 20. Two sets of pin supports 33 are formed on an inner surface of the door member 30. Each set of the pin supports 33 includes a pair of semi-circular protuberances 32. Each of the semi-circular protuberances 32 is provided with a pin receiving hole 31. The door member 30 is pivotable along with a first transmission shaft 130 through a pair of connecting hooks 50. Each of the connecting hooks 50 has a through hole 52 at its one end, and a hook 51 at the other end. In assembling, the connecting hooks 50 are positioned on the pin supports 33, respectively, and then a pin 53 is inserted through the pin receiving holes 31 and the through holes 52, thereby pivotably keeping the connecting hooks 50 on the pin supports 33. In order to guide a movement of the connecting hooks 50 in a vertical direction, a pair of panel guiding slots 23 are formed through the front panel 20.

On the other hand, reference numerals 24 and 25 represent a tact switch for triggering the inventive card receptor and a light receiver for receiving a remote control signal for triggering the inventive card receptor, respectively.

The driving mechanism 100 includes a base 110, a driving motor 120 and the first and a second transmission shafts 130 and 140. The base 110 having a plate portion 114 on which the driving motor 120 is mounted is fixed on the loading housing 10, with a screw hole 115 being aligned with the screw hole 13 of the lug plate 15. The driving motor 120 is largely divided into a main body 121 and shaft gear 122. The driving motor 120 is kept on the plate portion 114 by maintaining the main body 121 in a motor bracket 113. The motor bracket 113 resiliently grasps the main body 120. A driving force from the driving motor 120 is transmitted to the first transmission shaft 130 rotatably supported by a first shaft housing 111 formed on the base 110. The first transmission shaft 130 has a driving gear 132 at its center and a pair of side gears 133 at both ends thereof. The driving gear 132 has a pair of hook-mates 134 of a shape fitting with the hook 51 of the connecting hook 50. Each of the hook-mates 134 is adapted to rotate along with the shaft portion 131. The hooks 51 are to be engaged with the hook-mates 134, respectively. The driving force from the first transmission shaft 130 is transmitted to the second transmission shaft 140 through a pair of timing belts 150. The second transmission shaft 140 rotatably supported by a second shaft housing 112 has a pair of end gears 142 and a pair of pinions 143 fixed around both ends of a shaft portion 141. One end of each of the timing belts 150 is trained around the side gear 133 of the first transmission shaft 130, with the other kept around the end gear 142 of the second transmission shaft 140. The pair of the pinions 143 are engaged with the pair of the racks 43, respectively.

The operation of the inventive card receptor constructed in this manner will be described with reference to FIGS. 2 and 3.

When the user wishes to extract the card/disk from the internet set-top box from a situation wherein the door member 30 encloses the box opening 21 and the card carrier 40 from the surroundings, the tact switch 24 is first pressed which, in turn, energizes the driving motor 120. The driving force from the energized driving motor 120 is transmitted to the pair of racks 43, rotating the shaft gear 122, the driving gear 132, the pair of side gears 133, the timing belts 150, the pair of end gears 142 and the pair of pinions 143, in that order. At the same time, rotation of the driving gear 132 lifts the door member 30 to open the box opening 21, rotating the hook-mates 134 and the connecting hooks 50. As a result, the card carrier 40 moves forward by the rotation of the pinions 143 so that the card and the disk insertion slots 41 and 42 protrude out of the front panel 20 through the box opening 21. Accordingly, the user can easily extract the card/disk from the card/disk insertion slots 41 and 42.

When the user completes the card/disk extraction or exchange, the tact switch 24 is pressed again, rotating the driving motor 120 in a contrary direction to that in the door opening process, which will in turn, forces the lifted door member 30 move down, closing the box opening 21. At the same time, the pair of pinions 143 backs the card carrier 40 to the withdrawn position into the loading housing 10. As a result, the card/disk insertion slots 41 and 42 and the card carrier 40 are enclosed by the door member 30 from the surroundings within the housing.

Although the invention has been shown and described with respect to the preferred embodiments, it will be understood by those skilled in the art that various changes and modifications may be made without departing from the spirit and scope of the invention as defined in the following claims.

What is claimed is:

1. A card receptor comprising:

a housing having a bottom surface and a front panel with an opening formed through the front panel;

a pivotable door for opening and closing the opening;

a card carrier including a card insertion slot to receive and to keep a card therein through said card insertion slot, the card carrier movable between an inside position wherein the card insertion slot stays outside the front panel, and an outside position wherein the card insertion slot stays within the housing through the opening;

a guiding mechanism configured to guide the movement of the card carrier between the inside and the outside positions, allowing the card carrier to be aligned with the opening, the guiding mechanism including a bottom plate fixedly mounted on the bottom surface of the housing, a pair of side walls aligned with the opening each of the side walls having a guiding groove formed thereon, and a pair of guiding protuberances laterally formed on the card carrier and engaged into the pair of guiding grooves, respectively;

a carrier driving mechanism configured to move the card carrier toward the outside position thereof to allow the card insertion slot to protrude out of the front panel through the opening, and for moving the card carrier toward the inside position thereof to allow the card insertion slot to be enclosed from a surroundings; and an opening mechanism configured to open the pivotable door when the card carrier moves toward the outside position, for closing the pivotable door when the card carrier moves toward the inside position.

2. The card receptor of claim 1, wherein the carrier driving means comprises:

a driving motor adapted to rotate in a different direction between when the card carrier moves toward the inside position and when the card carrier moves toward the outside position;

a pair of racks formed on an outside surface of the card carrier; and a power transmission mechanism configured to transmit a driving force form the driving motor to said racks, the power transmission mechanism having a pair of pinions engaged with said racks, respectively.

3. The card receptor of claim 2, wherein said power transmission means comprises:

a driving gear connected with the driving motor;

a pair of side gears coaxially formed with the driving gear to rotate along with the driving gear;

a pair of end gears coaxially formed with said pinion to rotate along with the pinions; and a belt transmission mechanism configured to transmit the driving force between the side gear and the end gear.

4. The card receptor of claim 3, wherein said belt transmission means is a timing belt.

5. The card receptor of claim 1, wherein said guiding mechanism further comprises:

a pair of guiding slots formed on an upper and a lower surfaces of the card carrier, respectively; and a pair of corresponding guiding rails, the guiding rails being formed on the front panel and the bottom of the housing, respectively.

6. The card receptor of claim 1, wherein said opening mechanism comprises:

a pair of connecting hooks, each of the connecting hooks hinged on the pivotable door at its one end by a joint mechanism and having a hook at the other end; and a pair of hook-mates coaxially formed with the driving gear to rotate along with the driving gear, the hook-mates being engaged with the hooks, respectively to rotate along therewith.

7. The card receptor of claim 6, wherein said joint mechanism comprises:

two sets of pin supports formed on an inner surface of the pivotable door, each set of the pin supports having a pair of semi-circular protuberances, each of the semi-circular protuberances being provided with a pin receiving hole;

a pair of through holes formed through the connecting hooks, respectively; and a pin inserted through the through holes and the pin receiving holes.

8. The card receptor of claim 1, wherein said card carrier further includes a floppy disk insertion slot.

9. The card receptor of claim 1 further comprising a base fixed to the pair of side walls and having a plate portion on which the driving motor is mounted.

10. The card receptor of claim 9, wherein said plate portion is fixed on said side walls by a screw.

* * * * *